US011993960B2

(12) United States Patent
Wilke et al.

(10) Patent No.: US 11,993,960 B2
(45) Date of Patent: May 28, 2024

(54) DOOR HANDLE FOR A CAR, AND METHOD FOR PRODUCING A DOOR HANDLE (71) Applicant: ILLINOIS TOOL WORKS INC., Glenview, IL (US)

(72) Inventors: Zsolt Wilke, Bad Mergentheim (DE); Roland Och, Roettendorf (DE); Elmar Fries, Roettingen (DE); Massimo Trisorio, Wallduern (DE)

(73) Assignee: Illinois Tool Works Inc., Glenview, IL (US)

(*) Notice: Subject to any disclaimer, the term of this patent is extended or adjusted under 35 U.S.C. 154(b) by 168 days.

(21) Appl. No.: 17/193,114

(22) Filed: Mar. 5, 2021

(65) Prior Publication Data
US 2021/0189771 A1 Jun. 24, 2021

Related U.S. Application Data (63) Continuation of application No. 15/314,627, filed as application No. PCT/US2015/024225 on Apr. 3, 2015, now abandoned.

(30) Foreign Application Priority Data

Jun. 4, 2014 (DE) ...................... 10 2014 107 861.6

(51) Int. Cl.
E05B 77/06 (2014.01)
E05B 17/00 (2006.01)
E05B 85/16 (2014.01)

(52) U.S. Cl.
CPC .......... E05B 77/06 (2013.01); E05B 17/0004 (2013.01); E05B 85/16 (2013.01)

(58) Field of Classification Search
CPC .......... E05B 85/10; E05B 85/12; E05B 85/14; E05B 85/16; E05B 77/02; E05B 77/04;
(Continued)

(56) References Cited

U.S. PATENT DOCUMENTS 2,899,542 A 8/1959 De Mauro
4,022,504 A 5/1977 Anderson
(Continued)

FOREIGN PATENT DOCUMENTS

CN 101389822 A 3/2009
DE 19949119 A1 8/2000
(Continued)

OTHER PUBLICATIONS

Computer Generated Translation for EP 568896 A2, Generated on Sep. 6, 2022, https://worldwide.espacenet.com/ (Year: 2022).*
(Continued)

Primary Examiner — Alyson M Merlino
(74) Attorney, Agent, or Firm — Quarles & Brady LLP (57) ABSTRACT The invention relates to a door handle for a car, wherein the door handle has a handle section to be gripped manually and a pivoting bearing section, by way of which the door handle can be mounted on a car door such that it can be pivoted about a pivot axis between a closed position and an open position which unlocks the car door, wherein a metal ball, in particular a steel ball, or a metal cylinder, in particular a steel cylinder, is fastened to the door handle, wherein, if a predefined transverse acceleration which acts on the door handle occurs, the metal ball or the metal cylinder counteracts, as a counterweight, an opening force which acts on the handle section on account of the transverse acceleration. Moreover, the invention relates to a corresponding method for producing a door handle.

20 Claims, 4 Drawing Sheets (58) Field of Classification Search
CPC .. E05B 77/06; E05B 17/0004; E05B 17/0008; Y10T 292/57; Y10T 292/14; Y10S 292/22; Y10S 292/38; Y10S 292/53; Y10S 292/65

See application file for complete search history.

(56) References Cited

U.S. PATENT DOCUMENTS

| | | | |
|---|---|---|---|
| 6,431,023 | B1 | 8/2002 | Yoneyama |
| 6,471,262 | B1 | 10/2002 | Schwab |
| 7,036,857 | B2 | 5/2006 | Ichino |
| 7,527,307 | B2 | 5/2009 | Belchine, III et al. |
| 10,017,969 | B2 | 7/2018 | Och et al. |
| 2003/0001399 | A1 | 1/2003 | Sato |
| 2005/0093306 | A1* | 5/2005 | Pudney .................. E05B 85/16 292/216 |
| 2006/0028030 | A1 | 2/2006 | Tanimoto et al. |
| 2008/0290671 | A1 | 11/2008 | Kagawa et al. |
| 2009/0085360 | A1 | 4/2009 | Bertolotti |
| 2009/0102206 | A1 | 4/2009 | Lee |
| 2014/0197647 | A1 | 7/2014 | Daddis, Jr. et al. |
| 2016/0053519 | A1 | 2/2016 | Och et al. |
| 2018/0195320 | A1 | 7/2018 | Cousin et al. |
| 2018/0320421 | A1 | 11/2018 | Rudolf et al. |

FOREIGN PATENT DOCUMENTS

| | | | | |
|---|---|---|---|---|
| DE | 19936956 | A1 | | 2/2001 |
| DE | 102006027912 | A1 | | 12/2007 |
| DE | 1020070727844 | A1 | | 12/2008 |
| EP | 568896 | A2 | * 11/1993 | ............. E05B 3/06 |
| EP | 1860260 | A1 | | 11/2007 |
| EP | 2053186 | A1 | | 4/2009 |
| GB | 2353245 | A | | 2/2001 |
| GB | 2345437 | B | | 7/2001 |
| GB | 2432881 | A | * 6/2007 | ............. E05B 15/10 |
| JP | 2000073629 | A | | 7/2000 |
| JP | 2005002670 | A | | 1/2005 |
| JP | 5810622 | B2 | | 11/2015 |
| WO | 2014176008 | A1 | | 10/2014 |

OTHER PUBLICATIONS

Office Action from corresponding German patent application No. 102014107861.6 dated Jul. 6, 2020.
ISR and WO for PCT/US2015/024225 mailed Jul. 6, 2015.

* cited by examiner

DOOR HANDLE FOR A CAR, AND METHOD FOR PRODUCING A DOOR HANDLE

This application is a continuation of U.S. patent application Ser. No. 15/314,627, filed Nov. 29, 2016, which is a National Phase of International Application No. PCT/US2015/024225, filed Apr. 3, 2015, which relates to and claims priority benefits from German Patent Application No. 10 2014 107 861.6 filed Jun. 4, 2014, all of which are hereby incorporated by reference in their entireties.

The invention relates to a door handle for a car, wherein the door handle has a handle section to be gripped manually and a pivoting bearing section, by way of which the door handle can be mounted on a car door such that it can be pivoted about a pivot axis between a closed position and an open position which unlocks the car door.

Internal or external door handles of cars frequently have centrifugal weights or the like, in order to avoid undesired opening of the car door in the case of a side impact as a result of the associated transverse acceleration which acts on the door handle. An arrangement of this type is known, for example, from DE 10 2006 027 912 A1. It is also known to provide a spring which prestresses the door handle into the closed position in the case of a side impact and thus counteracts the moment of inertia which strives to open the door handle. The known apparatuses for preventing undesired opening of a car door in the case of a side impact are structurally complicated. Moreover, the known solutions are as a rule configured individually for the respective application. This makes the production and the assembly complicated.

Proceeding from the described prior art, the invention is based on the object of providing a door handle and a method of the type mentioned at the outset, which are simplified with regard to construction and production and permit greater standardization.

For a door handle of the type mentioned at the outset, the invention solves the object by virtue of the fact that a metal ball, in particular a steel ball, or a metal cylinder, in particular a steel cylinder, is fastened to the door handle, wherein, if a predefined transverse acceleration which acts on the door handle occurs, the metal ball or the metal cylinder counteracts, as a counterweight, an opening force which acts on the handle section on account of the transverse acceleration. Moreover, the invention relates to a method for producing a door handle. The metal cylinder is, in particular, a (straight) circular cylinder.

The door handle can be an internal door handle or an external door handle of a car. In a manner which is known per se, the door handle is mounted by way of its pivoting bearing section on the car door such that it can be pivoted about a pivot axis. The mounting of the pivoting bearing section can take place directly on the car door or else on a bearing section which is arranged on the car door. The door handle has a suitable connection to the door lock, for example via a Bowden cable. In this way, the door lock can be unlocked and the car door can be opened by way of pivoting of the door handle. The handle section can be, for example, elongate. The pivoting bearing section can be configured in the region of an end of the handle section.

According to the invention, a metal ball, preferably a steel ball, or a metal cylinder, in particular a steel cylinder, is fastened to the door handle. The metal ball or the metal cylinder forms a counterweight, in particular, with respect to the handle section of the door handle in such a way that the metal ball or the metal cylinder counteracts an opening force which acts on the door handle or its handle section in the case of a side impact on the car which is equipped with the door handle or the car door and transverse acceleration which is brought about as a result. In particular, the centroid of the door handle is displaced by way of the metal ball or the metal cylinder in such a way that no moment of inertia or at least no sufficient moment of inertia acts in the case of a side impact, in order to pivot the door handle into its open position. The center of mass (centroid) of the door handle with the metal ball fastened to it or the metal cylinder fastened to it is preferably displaced by way of the metal ball or the metal cylinder into the region of the pivoting bearing section, more preferably into the pivot axis of the door handle. This reliably avoids it being possible for the door handle to be pivoted into its open position by way of a moment of inertia in the case of high transverse acceleration.

In contrast to individually adapted centrifugal weights or counterweights which are known from the prior art, the metal ball or the metal cylinder is a standardized component which can be used for a very wide variety of door handles. It can be, for example, a ball bearing ball in a particularly simple way. The provision of a standardized metal ball or standardized metal cylinder is simple and inexpensive. Moreover, simple and standardized assembly is made possible. It is conceivable to use uniform tools for the production and costs can be lowered by way of a broad field of application. In comparison with plastic counterweights, moreover, the metal ball or the metal cylinder represents a space-saving variant, in particular on account of the higher density of the metal.

The door handle can be composed of a plastic. It can be configured in one piece. Door handles made from plastic are light, inexpensive and can be produced flexibly. According to a further refinement, the metal ball or the metal cylinder can be molded at least in sections into the door handle in the context of a plastic injection molding process for producing the door handle. It goes without saying that the metal ball or the metal cylinder can also be molded completely into the plastic. The plastic section which encloses the metal ball or the metal cylinder at least in sections during the molding operation can be arranged spaced apart from a section (for example, the handle section) which forms a visible surface of the door handle, in order to avoid visual impairments as a result of the molding of the metal ball or the metal cylinder, such as sink marks, in the visible surface. The molding of the metal ball or the metal cylinder permits particularly simple and flexible assembly with a simultaneously excellent retaining force. Here, the ball or the cylinder can be held on the door handle by way of an additional holding element, for example a holding bracket, it being possible for the additional holding element to likewise be produced during the plastic injection molding operation.

It is also possible that the metal ball or the metal cylinder is held in a latching manner in a latching receptacle of the door handle. The latching receptacle can have, for example, a plurality of elastic latching arms which hold the metal ball or the metal cylinder.

It is possible according to a further refinement that the metal ball or the metal cylinder is held by way of a force fit in a force-fit receptacle of the door handle.

It is possible according to a further refinement that, after the fastening of the metal ball or the metal cylinder, the door handle with the metal ball fastened thereto or the metal cylinder fastened thereto has been coated, preferably has been coated galvanically, further preferably has been chrome-plated. The plastic of the door handle is advantageously relatively flexible before a galvanic coating. As a result, the fastening of the metal ball or the metal cylinder by way of a latching connection or a force fit is readily possible. However, the retaining force is then not optimum in some circumstances on account of the flexibility of the plastic. The application of a galvanic coating, for example chrome-plating, is firstly often desired in visual terms. Secondly, as a result of the galvanic coating, in particular chrome-plating, of the door handle including the metal ball or the metal cylinder, the latter are incorporated even more satisfactorily into the door handle. The plastic becomes less flexible as a result of the galvanic coating, as a result of which, for example, a latching connection or a force fit provides a higher retaining force. It goes without saying that other coatings are also conceivable, for example paints or PVD coatings (physical vapor deposition) or CVD coatings (chemical vapor deposition) or other coatings. As an alternative, it is of course also possible to insert the metal ball or the metal cylinder into the door handle only after the application of a coating, for example a galvanic coating.

The invention also relates to a car door, comprising a door handle according to the invention which is mounted pivotably thereon.

Moreover, the invention achieves the object by way of a method for producing a door handle, comprising the steps:
provision of a plastic injection mold with a mold cavity which represents the door handle,
automatic feeding and holding of a metal ball or a metal cylinder in a predefined position in the mold cavity,
injection of a plasticized plastic into the mold cavity, wherein the plasticized plastic flows at least in sections around the metal ball which is held in the predefined position or around the metal cylinder which is held in the predefined position,
opening of the plastic injection mold after a curing time and removal of the door handle with the metal ball which is molded at least in sections into said door handle or the metal cylinder which is molded at least in sections into said door handle.

In a particularly simple way in terms of manufacturing technology, the metal ball or the metal cylinder which is to be molded into the door handle is fed automatically into the mold cavity into a predefined position and is held in said position for the subsequent plastic injection molding operation. The plasticized plastic which is introduced into the mold cavity during the injection molding flows at least in sections, in particular completely, around the metal ball or the metal cylinder which is held in the predefined position. After a cooling operation for sufficient dimensional stability, the door handle with the metal ball or the metal cylinder which is molded into it at least in sections is removed from the plastic injection mold. The automatic feeding of the metal ball or the metal cylinder can take place, for example, from a metal ball reservoir or a metal cylinder reservoir. Holding of the metal ball or the metal cylinder in the predefined position can take place, for example, by way of a movable slide of the plastic injection mold.

It can be provided according to a further refinement that the plastic injection mold has a slide which delimits the mold cavity in sections and can be moved in the longitudinal direction within a cavity, wherein the metal ball or the metal cylinder falls into the cavity when the slide is withdrawn from the mold cavity, and wherein the metal ball or the metal cylinder is subsequently conveyed, in particular rolled, by a movement of the slide in the longitudinal direction within the cavity along a conveying path into the predefined position in the mold cavity. The geometries of the ball or the (circular) cylinder permit feeding by way of rolling without undesired friction, both first of all into the cavity and subsequently along the conveying path into the mold cavity of the injection mold. In a position, in which it is moved completely into the plastic injection mold, the slide delimits part of the mold cavity, in particular, at least with its end face. The slide can be moved in the longitudinal direction, in particular by way of a dedicated drive, for example a hydraulic drive. Its movement is guided in the cavity. The cavity at the same time defines the conveying path for the metal ball or the metal cylinder. In each case one metal ball or one metal cylinder falls into the cavity for a molding operation, for example from a reservoir, if the slide has been retracted sufficiently far out of the cavity. The metal ball or the metal cylinder can fall into the cavity as a result of gravity. When the metal ball or the metal cylinder has fallen into the cavity, the slide is displaced in the cavity in the direction of the mold cavity and in the process presses the metal ball or the metal cylinder into its predefined position, preferably in a rolling manner. Subsequently, the plasticized plastic can be introduced into the mold cavity. In this way, the automatic feeding of the metal ball or the metal cylinder is made possible in a particularly simple way and without an extension of the cycle time. As an alternative, it would of course also be possible in principle to feed in the metal balls or the metal cylinders in each case for a molding operation by means of a robot arm or the like, possibly extending the cycle time, however.

It can be provided according to a further refinement that the cavity is formed by a hollow slide which surrounds the slide at least in sections and can be moved in the longitudinal direction independently of the slide, wherein the metal ball or the metal cylinder falls into the cavity of the hollow slide when the slide is withdrawn from the hollow slide, wherein the metal ball or the metal cylinder is subsequently conveyed by a movement of the slide in the longitudinal direction within the hollow slide along the conveying path into the predefined position in the mold cavity. The hollow slide is, in particular, of hollow configuration and the slide is guided such that it can be moved in the longitudinal direction in the cavity of the hollow slide. The hollow slide can be open on one side, with the result that the metal ball or the metal cylinder can fall into the cavity via said opening. It is also possible that the hollow slide forms a cavity which is closed over its entire circumference. It is possible then, in particular, that the hollow slide has a bore in its outer wall, through which the metal ball or the metal cylinder can fall into the cavity. The slide can be displaced in the hollow slide in the longitudinal direction independently of the hollow slide. The hollow slide can likewise be moved in the longitudinal direction, in particular likewise by way of a dedicated drive, for example a hydraulic drive. It can likewise delimit the mold cavity. The metal ball or the metal cylinder falls into the cavity which is formed by the hollow slide when the hollow slide is arranged in the longitudinal position which is provided for this purpose, in particular in a position, in which it is moved completely in the direction of the mold cavity. By way of its outer wall, the hollow slide can form a clearance in the molded plastic part between the section which holds the metal ball or the metal cylinder and an adjacent section, for example the handle section, which forms a visible surface of the door handle.

In principle, the metal ball or the metal cylinder can be held between the slide and a suitable stop in the predefined position in the mold cavity. To this end, it can be provided that a further slide is provided which can be moved in the longitudinal direction and, in a position in which it is moved into the mold cavity, forms a stop for holding the metal ball or the metal cylinder in the predefined position. Said further slide can be movable, for example, transversely with respect to the first slide which conveys the metal ball or the metal cylinder into the predefined position, once again by way of a dedicated drive, for example a hydraulic drive.

It can be provided according to a further refinement that a blocking pin which is mounted such that it can be displaced in its longitudinal direction is provided, which blocking pin is prestressed into a blocking position which protrudes in sections into the conveying path of the metal ball or the metal cylinder, wherein the metal ball or the metal cylinder presses the blocking pin, during the conveying along its conveying path into its predefined position in the mold cavity, out of its blocking position into a released position which releases the conveying path. The blocking pin can be mounted, in particular, such that it can be moved transversely with respect to the movement direction of the slide which conveys the metal ball or the metal cylinder into the predefined position. The blocking pin is prestressed, for example, by way of a spring into its blocking position. However, it can also be prestressed pneumatically or in some other way. In the blocking position, the blocking pin protrudes in sections into the cavity which defines the conveying path of the metal ball or the metal cylinder. The blocking pin prevents metal balls or metal cylinders which have fallen into the cavity being able to roll into the mold cavity of the injection mold. The metal ball or the metal cylinder presses the blocking pin out of its blocking position into its released position only when the metal ball or the metal cylinder which has fallen into the cavity in each case is pressed by way of the slide into its predefined position, with the result that the metal ball or the metal cylinder can pass the blocking pin. That tip of the blocking pin which protrudes into the conveying path of the metal ball in the blocking position can, for example, taper conically or be rounded. This simplifies pressing of the blocking pin into its released position.

The door handle with the metal ball which is molded at least in sections into said door handle or the metal cylinder which is molded at least in sections into said door handle can be coated galvanically, in particular chrome-plated, after the removal from the plastic injection mold.

Furthermore, after the removal from the plastic injection mold and optionally after a galvanic coating, the door handle with the metal ball which is molded at least in sections into said door handle or the metal cylinder which is molded at least in sections into said door handle can be mounted pivotably by way of its pivoting bearing section on a car door.

In the following text, exemplary embodiments of the invention will be explained in greater detail using figures, in which, diagrammatically.

Figure 1:
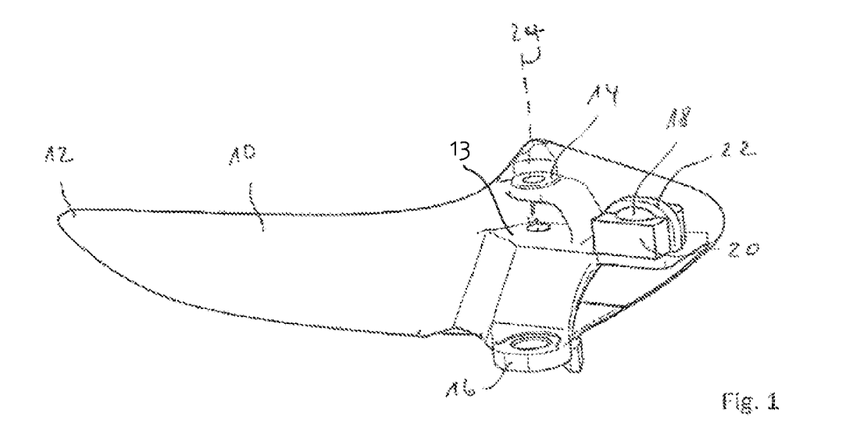
FIG. 1 shows a door handle according to the invention according to a first exemplary embodiment in a first perspective view.

Insofar as nothing else is specified, identical designations denote identical objects in the figures. The door handle according to the invention which is shown in FIG. 1 is an internal door handle of a car. It has a handle section 10 (elongate in the example which is shown) which can be gripped manually and has a free end 12. At its opposite end, the door handle has a horizontal base surface 13 and a pivoting bearing section 14. The pivoting bearing section 14, by way of which the door handle can be mounted pivotably on a car door (not shown), in the present case can pivot about a vertical pivot axis 24. By way of an unlocking section 16 of the door handle, said door handle can be coupled to the door lock of the car door, for example via a Bowden cable (not shown), in such a way that the door lock is unlocked into an open position by way of pivoting of the door handle. The door handle is prestressed in a suitable way into its closed position. This is known per se. A metal ball 18 is incorporated into the door handle on that side of the pivoting section 14 which lies opposite the handle section 10. Although a metal ball 18 which is incorporated into the door handle is shown in the figures, it might also be a metal cylinder which is incorporated into the door handle. In the example which is shown, the door handle is composed in one piece of a plastic and was produced in a plastic injection molding process. In the context of this plastic injection molding process, the metal ball 18 was molded into the door handle, in particular into a plastic section 20 which partially encloses the metal ball 18. Furthermore, the plastic section 20 has a holding bracket 22 which partially covers the metal ball 18 and is likewise produced during the plastic injection molding process. It can be seen, in particular, in FIG. 2 that there is a spacing 23 between the plastic section 20 which holds the metal ball 18 and the handle section 10 which forms a visible surface of the door handle. This spacing 23 ensures that shrinkages which possibly occur during the molding of the metal ball 18 do not lead to visual impairments, for example sunk points, on the handle section 10 and the visible surface. As a result of the metal ball 18, the center of mass of the door handle is moved substantially into the pivot axis 24 which is defined by the pivoting bearing section 14. The metal ball 18 therefore acts as a counterweight, with the result that a high transverse acceleration which is produced as a result of a side impact on the vehicle cannot lead to undesired pivoting of the door handle into the open position and therefore opening of the car door.

Figure 3:
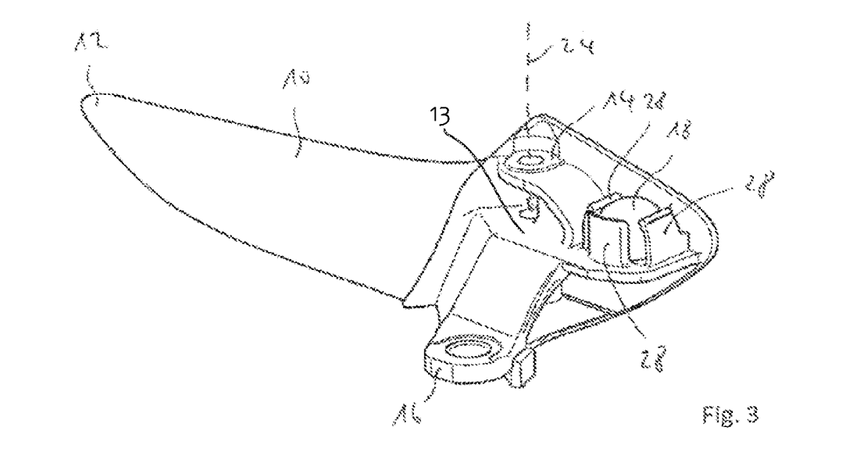
FIG. 3 shows a door handle according to the invention according to a second exemplary embodiment in a perspective view.

The door handle which is shown in FIG. 3 corresponds as far as possible to the door handle which is shown in FIG. 1. It differs merely with regard to the fastening of the metal ball 18 to the door handle. Unlike in the exemplary embodiment of FIG. 1, the metal ball 18 in the exemplary embodiment of FIG. 3 is held on the door handle by way of a latching connection. In particular, a latching receptacle is formed by in this case three elastic latching arms 28 which hold the metal ball 18 in a latching manner. The function of the metal ball 18 is as was explained with respect to FIG. 1.

Figure 4:
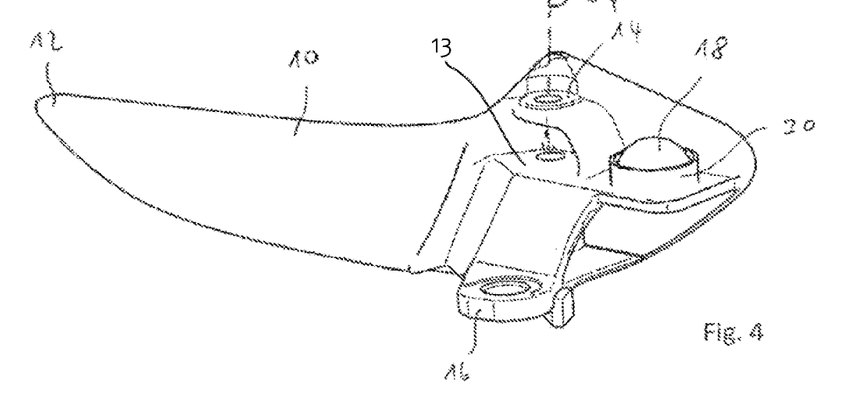
FIG. 4 shows a door handle according to the invention according to a third exemplary embodiment in a perspective view.

FIG. 4 shows a further exemplary embodiment of a door handle according to the invention which once again corresponds as far as possible to the exemplary embodiment according to FIG. 1. In contrast to the exemplary embodiment according to FIG. 1, in the exemplary embodiment of FIG. 4 the metal ball 18 is held by way of a force fit in a force-fit receptacle 30 of the door handle. The function of the metal ball 18 is once again as was explained above with respect to the exemplary embodiment of FIG. 1.

In all of the exemplary embodiments which are shown in FIGS. 1 to 4, it is possible that the door handle with the metal ball 18 which is inserted into it is subjected to a galvanic coating, for example chrome-plating. This leads to an increased retaining force precisely in the case of the metal ball being fastened in a latching receptacle or in a force-fit receptacle according to FIGS. 3 and 4.

Figure 2:
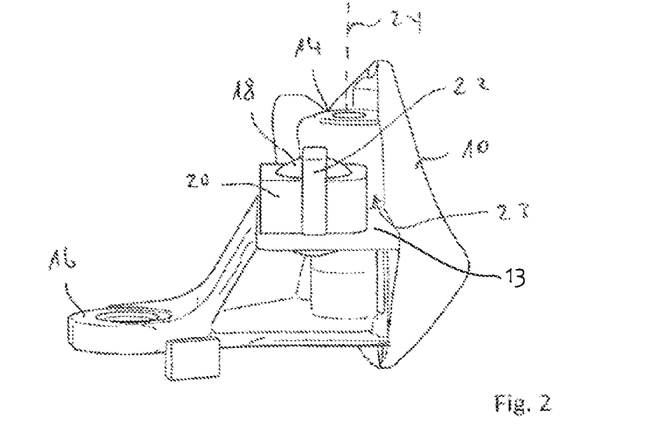
FIG. 2 shows the door handle from FIG. 1 in a second perspective view.
Figure 5:
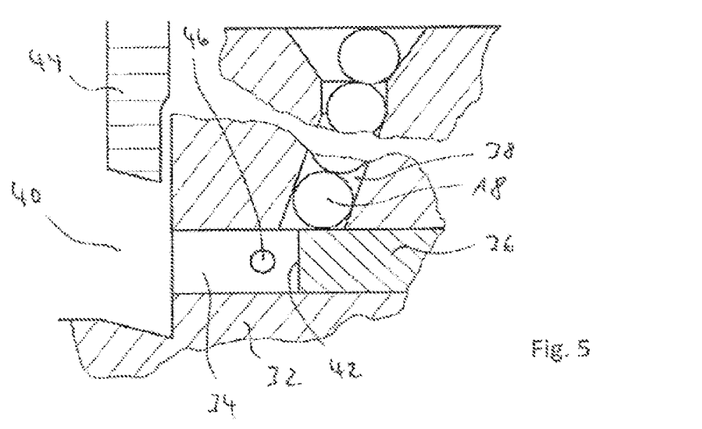
FIG. 5 shows part of a plastic injection mold for producing a door handle according to the invention in a first operating position in a sectional view.

In relation to the production of the door handle according to the invention which is shown in FIGS. 1 and 2, the automatic feeding of a metal ball 18 into a predefined position in a plastic injection mold and the automatic holding of the metal ball 18 in said predefined position for the plastic injection molding process are to be explained using FIGS. 5 to 8. FIGS. 5 to 8 show details of a plastic injection mold at the designation 32. In the example which is shown, a cavity 34 is formed in the plastic injection mold 32, in which cavity 34 a slide 36 is guided such that it can be moved in the longitudinal direction, from left to right and vice versa in FIGS. 5 to 8. For this purpose, a suitable drive can be provided, for example a hydraulic drive. A feed channel 38 is formed in the plastic injection mold 32, in which feed channel 38 metal balls 18 are fed in from a metal ball reservoir (not shown in greater detail). In the operating position which is shown in FIG. 5, the slide 36 closes the access for the metal balls 18 from the feed channel 38 into the cavity 34 on account of the longitudinal position of said slide 36. The cavity 34 opens into a mold cavity 40 for producing a door handle according to the invention. Here, by way of its end side 42, the slide 36 forms part of the boundary of the mold cavity. The cavity 34 also in sections forms a boundary of the mold cavity.

Figure 6:
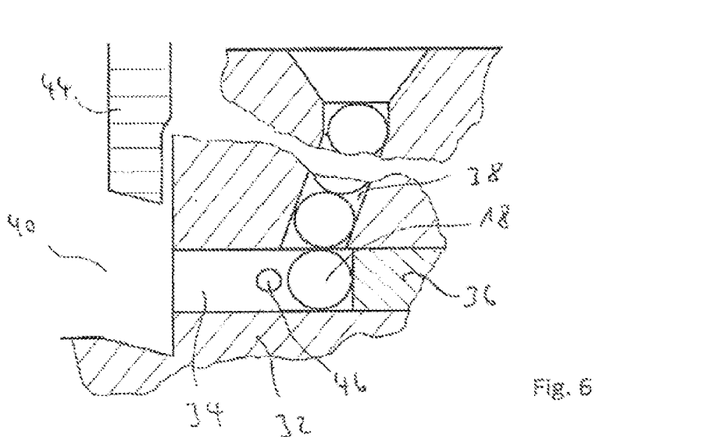
FIG. 6 shows the illustration from FIG. 5 in a second operating position.
Figure 7:
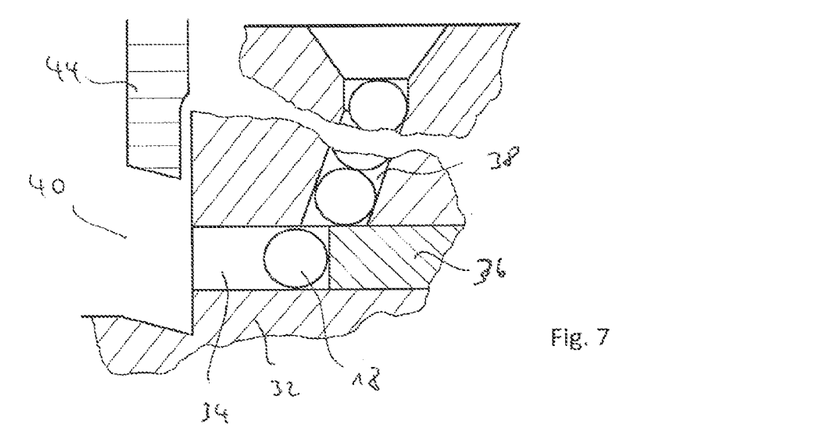
FIG. 7 shows the illustration from FIG. 5 in a third operating position.
Figure 9:
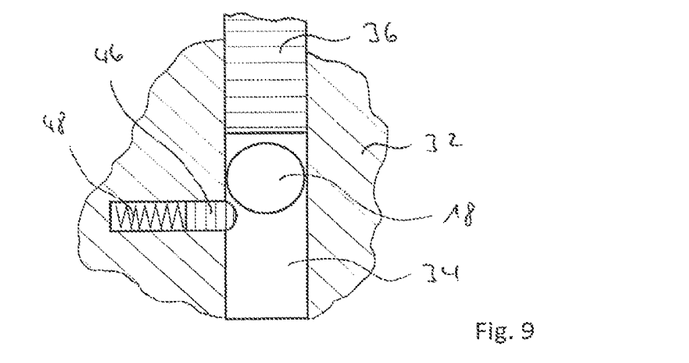
FIG. 9 shows a further sectional view of the plastic injection mold in the operating position which is shown in FIG. 6.
Figure 10:
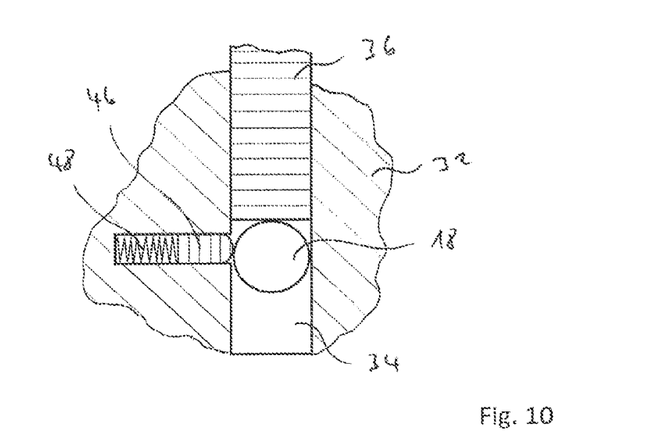
FIG. 10 shows the illustration from FIG. 9 in the operating position which is shown in FIG. 7.
Figure 11:
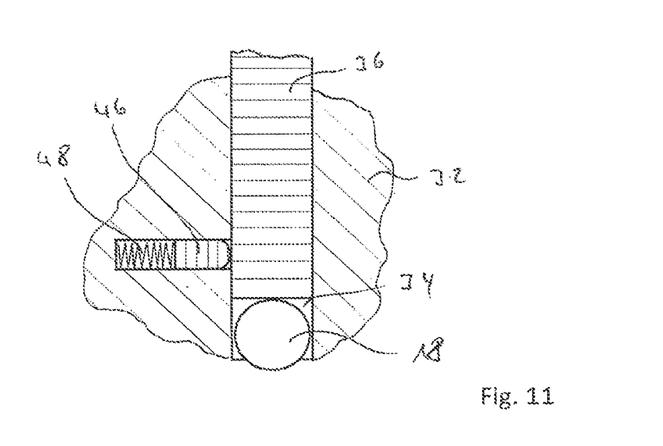
FIG. 11 shows the illustration from FIG. 9 in the operating position which is shown in FIG. 8.

Moreover, FIGS. 5 to 8 show a second slide 44 which is likewise guided such that it can be moved in the longitudinal direction, in the present case transversely with respect to the movement direction of the slide 36, and likewise delimits the mold cavity. If the first slide 36 is withdrawn out of the cavity 34 from the position which is shown in FIG. 5, that is to say moved to the right in FIG. 5, into the position which is shown in FIG. 6, a metal ball 18 can fall from the feed channel 38 into the cavity 34. In the example which is shown, the metal ball 18 falls into the cavity 34 solely as a result of gravity. A blocking pin 46 protrudes in sections into the conveying path of the metal ball 18, which conveying path is formed by the cavity 34. The blocking pin 46 prevents it being possible for the metal ball 18 to roll into the mold cavity 40 in the operating position which is shown in FIG. 6. If the slide 36 is then displaced from the operating position which is shown in FIG. 6 in the direction of the mold cavity 40, that is to say to the left in FIG. 6, the metal ball 18 which is conveyed by the slide 36 along the cavity 34 presses the blocking pin 46 inward counter to a spring prestress, with the result that the metal ball 18 can be pushed past the blocking pin 46. This can be seen, in particular, in FIGS. 9 to 11, in which a cross section in this regard is shown. The spring which prestresses the blocking pin 46 into its blocking position which protrudes into the cavity 34 is shown at the designation 48. It can also be seen here that the tip of the blocking pin 46 which protrudes into the cavity 34 is rounded.

Figure 8:
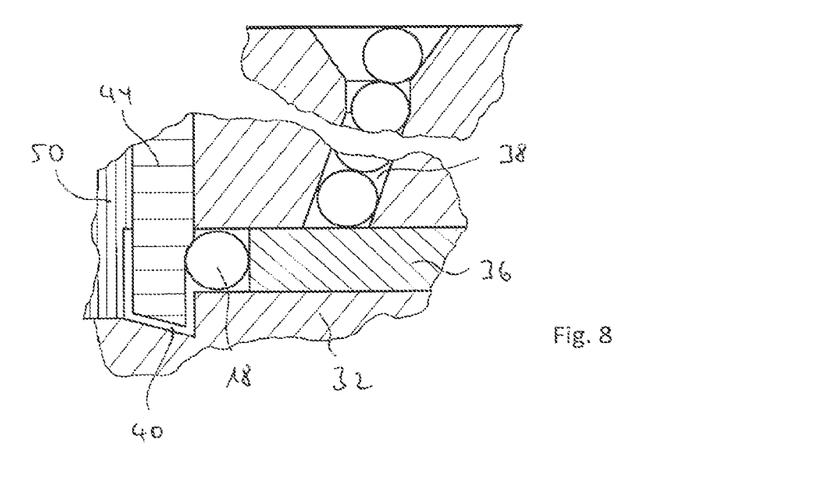
FIG. 8 shows the illustration from FIG. 5 in a fourth operating position.

In the further course, the metal ball 18 is moved by the slide 36 into the predefined position which is shown in FIG. 8. Parallel to this, the second slide 44 is moved in the longitudinal direction, downward in FIG. 7 into the position which is shown in FIG. 8 and in which the second slide 44 forms a stop for the metal ball 18, with the result that the latter is held in the predefined position by the slides 36 and 44. A further part 50 of the plastic injection mold closes the mold cavity 40. In the position which is shown in FIG. 8, plasticized plastic can be introduced into the mold cavity 40, which plastic partially flows around the metal ball 18, with the result that, in the cured state, the metal ball 18 is molded at least in sections into the door handle which is displayed in the mold cavity 40, as is shown in FIG. 1, for example. After a sufficient dimensional stability is achieved, the door handle together with the molded metal ball 18 is removed from the injection mold 32. The door handle can then be subjected together with the metal ball 18 to a galvanic coating, for example chrome-plating.

The invention claimed is:

1. A door handle for a car, the door handle comprising:
a handle section having a free end and defining a longitudinal handle axis extending along a length of the handle section;
a horizontal base surface extending from the handle section;
a counterweight section opposite the free end and extending from the horizontal base surface;
a counterweight configured as a ball and secured to the door handle at the counterweight section; and
a pivoting bearing section connected to and extending from the horizontal base surface and defining a pivot axis,
wherein the longitudinal handle axis is offset from the pivot axis, and
wherein the handle section, the horizontal base surface, the counterweight section, and the pivoting bearing section are integrally formed as one unitary body configured to be mounted on the car.

2. The door handle of claim 1, wherein a centroid of the door handle lies along the pivot axis.

3. The door handle of claim 1, wherein the pivoting bearing section is configured to be mounted directly on a car door to pivot about the pivot axis between a closed position and an open position, which unlocks the car door, and
wherein the ball is secured to the door handle so that the ball counteracts a transverse acceleration acting on the door handle.

4. The door handle of claim 1, wherein the counterweight section includes the ball partially enclosed within a plastic section, the plastic section extending from the horizontal base surface in a direction parallel to the pivot axis, and
wherein the plastic section is transversely offset from the handle section to form a spacing between the plastic section and the handle section.

5. The door handle of claim 4, wherein the counterweight section includes a holding bracket that extends from a first side of the plastic section to a second side of the plastic section to partially cover the ball.

6. The door handle of claim 5, wherein the holding bracket extends in a direction parallel to the longitudinal handle axis.

7. The door handle of claim 4, wherein the plastic section includes a first elastic latching arm, a second elastic latching arm, and a third elastic latching arm to secure the ball within the counterweight section.

8. An interior door handle for a car, the door handle comprising:
- a door handle section defining a free end and a visible surface of the door handle;
- a base surface extending from the handle section opposite the visible surface of the door handle;
- a counterweight section extending from and integrally formed with the base surface;
- a counterweight configured as a ball and secured to the door handle at the counterweight section;
- a pivoting bearing section disposed between the free end and the counterweight section, the pivoting bearing section defining a pivot axis; and
- an unlocking section configured to be coupled to a door lock of a door, the unlocking section extending transversely from the pivoting bearing section via a first rib and a second rib that are integrally formed with the door handle, the first rib extending from the base surface and the second rib extending from the handle section and parallel to the base surface.

9. The interior door handle of claim 8, wherein the first and second ribs form an interior cavity proximate the counterweight section and opposite the visible surface.

10. The interior door handle of claim 9, wherein the pivoting bearing section defines a passageway that extends along the pivot axis, through the interior cavity, and is configured to pivotably mount the door handle directly to the car door.

11. The interior door handle of claim 8, wherein the first rib is skewed relative to the pivot axis.

12. The interior door handle of claim 8, wherein the handle section defines a longitudinal axis that extends along a length of the handle section wherein the longitudinal axis is offset from the pivot axis.

13. The interior door handle of claim 8, wherein the counterweight section includes a latching receptacle that is configured to receive and secure the ball, configured as a metal ball bearing, via a force fit.

14. The interior door handle of claim 13, wherein the latching receptacle includes a first wall that extends parallel to a second wall, and a third wall that extends perpendicular to each of the first wall and the second wall.

15. The interior door handle of claim 14, wherein each of the first, second, and third walls define a first height, and the ball defines a second height, and
- wherein the second height is greater than the first height so that the ball extends above the first, second, and third walls.

16. The interior door handle of claim 13, wherein the latching receptacle is offset from an opposing side of the visible surface.

17. A door handle for a car, the door handle comprising:
- a handle section defining a free end and a first wall and a second wall;
- a pivoting bearing section defining a pivot axis for the door handle;
- a counterweight section opposite the free end, the counterweight section connected to and extending transversely from the second wall; and
- a latching receptacle extending from the counterweight section and offset transversely from the second wall to define a spacing between the latching receptacle and the second wall, the latching receptacle dimensioned to secure a counterweight configured as a ball, the ball secured to the door handle so that the ball counteracts a transverse acceleration acting on the door handle, wherein the first wall and the second wall are opposing.

18. The door handle of claim 17, wherein the latching receptacle is configured to receive the ball via a force fit.

19. The door handle of claim 17, further comprising a pivoting bearing section that extends vertically proximate to the second wall and defines a pivot axis.

20. The door handle of claim 19, wherein the pivoting bearing section is configured to pivotably secure the door handle directly to the car door.

\* \* \* \* \*